J. M. SCHWAB.
SHAFT COUPLING.
APPLICATION FILED JULY 19, 1909.
969,662.
Patented Sept. 6, 1910.
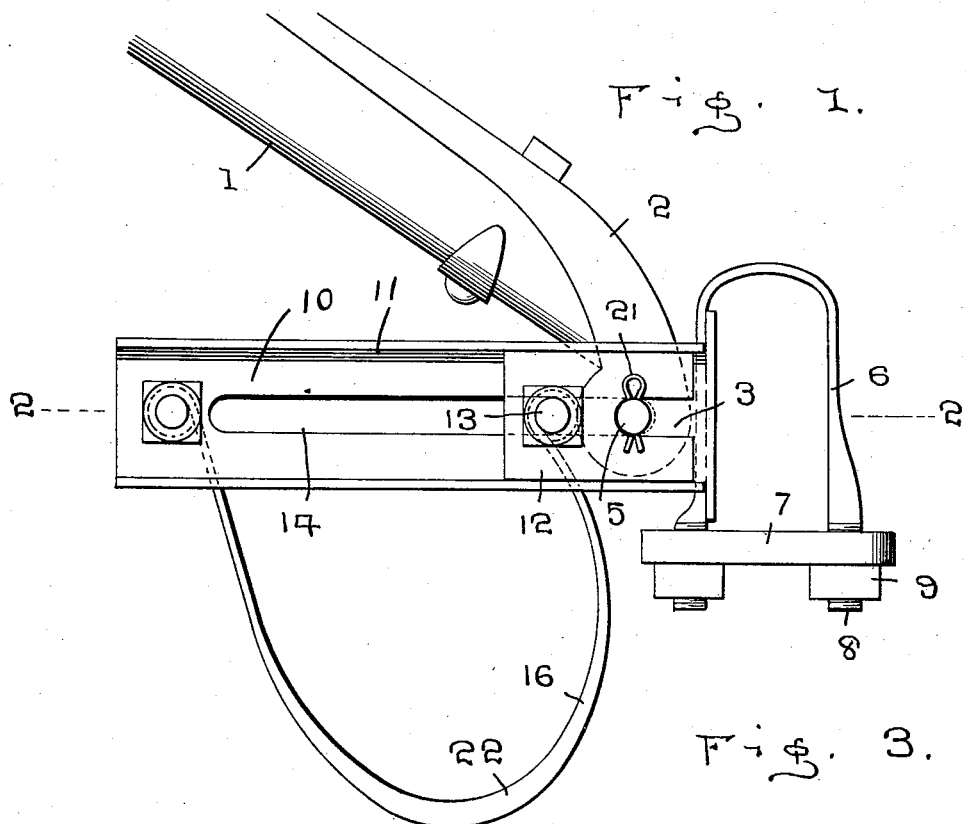
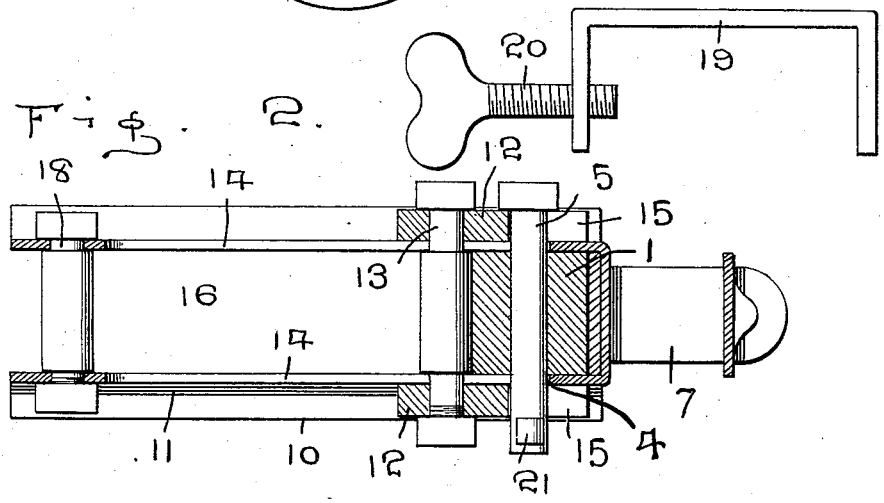
WITNESSES:
Thos. W. Riley
J. R. French
INVENTOR
J. M. Schwab
BY
W. J. Fitzgerald
Attorneys

UNITED STATES PATENT OFFICE.

JOHN M. SCHWAB, OF MARION, MASSACHUSETTS.

SHAFT-COUPLING.

969,662.  Specification of Letters Patent.  Patented Sept. 6, 1910.

Application filed July 19, 1909.  Serial No. 508,295.

*To all whom it may concern:*

Be it known that I, JOHN M. SCHWAB, a citizen of the United States, residing at Marion, in the county of Plymouth and State of Massachusetts, have invented certain new and useful Improvements in Shaft-Couplings; and I do hereby declare the following to be a full, clear, and exact description of the invention, such as will enable others skilled in the art to which it appertains to make and use the same.

My invention relates to new and useful improvements in shaft couplings and my object is to provide means for yieldingly attaching the shafts to parts of the vehicle.

A further object is to provide means for holding the shafts in engagement with the parts of the vehicle.

A further object is to provide means for normally holding the ends of the shaft adjacent the axle of the vehicle and a still further object is to provide means for holding parts of the device out of engagement with the ends of the shafts while the same are being introduced or removed from engagement with parts of the couplings.

Other objects and advantages will be hereinafter referred to.

In the accompanying drawings forming part of this specification, Figure 1 is a side elevation of the lower portion of a shaft showing my improved coupling applied to use thereon. Fig. 2 is a sectional view as seen on line 2—2, Fig. 1, and, Fig. 3 is a detail view of a clamp employed for contracting the spring of the coupling.

Referring to the drawings in which similar reference numerals designate corresponding parts throughout the several views, 1 indicates a shaft, the end of which is provided with the usual form of strap 2, which terminates at its free end in a socket or heel 3, said socket having a transversely disposed opening 4 therethrough for the reception of a retaining bolt 5.

Attached to the forward axle (not shown) of the vehicle is a clip 6 having at its lower end a yoke 7 which engages the stems 8 of the clip and is secured thereon by means of nuts 9, the clip 6 being formed in the usual or any preferred manner.

Attached to the clip 6 or formed integral therewith, is a pair of parallel plates 10, which extend a distance forwardly from the clip and have their upper and lower edges extended at right angles to form channels 11, in which are adapted to be seated blocks 12, one for each plate, the blocks being attached together by means of a bolt 13, which extends laterally through slots 14 in the plates 10 and through said blocks. The rear ends of the blocks 12 are provided with recesses 15, into which enters the bolt 5 employed for engaging the socket 3 of the shaft, said bolt being likewise extended through the slots 14 and as said slots extend substantially the full length of the plates 10, the shaft will have considerable movement away from the clips. It is desired, however, to normally retain the socket 3 adjacent the clip 6 and to accomplish this result, a bowed spring 16 is provided, the ends of which are secured, respectively, around the bolt 13 at one end, while the opposite end of the spring is attached to a bolt 18 extending through the ends of the plates 10 forwardly of the ends of the slots, said bolt 18 also serving to hold the ends of the plates in proper alinement.

In applying the device to use, the spring 16 is contracted by placing thereon a clamp 19, through one portion of which extends a screw 20 and by turning said screw inwardly, the two sections of the spring may be moved together, thereby removing the pressure of the spring from the socket 3. After this is accomplished, the ends of the shafts containing the sockets, are introduced between the rear ends of the plates 10 and the bolt 5 extended through the slots 14 and through the opening in the socket and in order to hold the bolt 5 against casually leaving the opening in the socket, a split key 21 or other suitable device may be engaged with the bolt.

The clamp 19 is then removed from the spring, whereupon the blocks will be moved rearwardly and the recesses therein engaged with the bolt 5, the tension of the spring being such as to normally hold the sockets adjacent the clip, but should the animal drawing the vehicle, suddenly lunge forwardly the resulting jar would be lessened as the springs would yield and the shafts move forwardly and by increasing the thickness and width of the spring as shown at 22, the forward movement of the shafts will increase the tension of the springs to such an extent that their forward movement will be gradually checked, this action preventing the occupants of the vehicle from receiving the force of the shock.

This device can be used in connection with poles for vehicles, as well as the shafts and it will be seen that they can be quickly detached or attached by contracting the spring as described and it will likewise be seen that the plates may be readily attached to any suitable form of vehicle and at a minimum expense and it will further be seen that as the socket and bolt become worn, the blocks will move rearwardly and compensate for such wear, thereby lessening rattling of the socket.

What I claim is:

1. The combination with a shaft having a socket thereon, of a clip, parallel plates carried by said clip, having elongated slots therein, the longitudinal edges of said plates being provided with lateral extensions forming channels laterally of said slots, blocks slidably mounted in such channels, having recesses therein, a bolt extending through said slots and the recesses in said blocks and also through said socket, an additional bolt carried by said blocks and extending through said slots, and a spring applied to a bolt at one end of said plates, the opposite end of such spring being applied to said additional bolt, said recesses allowing said blocks to have longitudinal movement independent of said first referred to bolt.

2. In a device of the character described, the combination with a shaft and a socket thereon, of a clip, parallel plates carried by said clip having elongated slots therein and laterally bent portions on the upper and lower edges thereof to form channels, blocks having elongated recesses therein and seated in said channels, a bolt passing through said socket, the slots and recesses in said blocks, a spring, a bolt securing the ends of the plates in alinement and retaining one end of said spring and an additional bolt engaging the opposite end of said spring and passing through said slots and blocks, said additional bolt adapted to travel in the slots, when pressed by said shaft.

3. The combination with a shaft and socket thereon; of a clip, parallel plates carried by said clip, said plates having elongated slots therein and the longitudinal edges thereof bent laterally to form channels, blocks slidably mounted in the channels of said plates, said blocks having recesses extending therein, a bolt extending through the slots in said plates and engaging and retaining said blocks within said channels, a spring having one end in engagement with said bolt between said parallel plates, a bolt securing the ends of said plates in alinement, the other end of said spring engaging said last mentioned bolt between said plates, an additional bolt extending through said socket and slots adapted to be seated in the recesses of said blocks and means to retain said bolts in position.

In testimony whereof I have signed my name to this specification in the presence of two subscribing witnesses.

JOHN M. SCHWAB.

Witnesses:
 FRANK M. TRIPP,
 HELEN C. NYE.